ized Statesd

United States Patent [19]

Ponczek

[11] 4,373,398
[45] Feb. 15, 1983

[54] INDICATING GAUGE WITH PRESSURE RELIEF VALVE

[75] Inventor: George M. Ponczek, Chicago, Ill.

[73] Assignee: Stewart-Warner Corporation, Chicago, Ill.

[21] Appl. No.: 230,447

[22] Filed: Feb. 2, 1981

[51] Int. Cl.³ .......................... G01L 19/06; G01L 7/08
[52] U.S. Cl. ........................................ 73/738; 73/431; 73/715
[58] Field of Search ............... 73/738, 431, 756, 715, 73/431, 700; 137/70, 68 R, 71

[56] References Cited

U.S. PATENT DOCUMENTS

| | | | |
|---|---|---|---|
| 3,388,601 | 6/1968 | Ingham | 73/738 |
| 3,795,148 | 3/1974 | Luich | 73/738 |
| 3,929,020 | 12/1975 | Honkanen | 73/738 |
| 3,938,393 | 2/1976 | Morgensen et al. | 73/431 |
| 4,096,760 | 6/1978 | Bilbert et al. | 73/738 |
| 4,154,116 | 5/1979 | Stahn et al. | 73/738 |
| 4,248,080 | 2/1981 | Chuck | 73/738 |

*Primary Examiner*—Donald O. Woodiel
*Attorney, Agent, or Firm*—A. G. Douvas

[57] ABSTRACT

A vehicular instrument or gauge of the type that has a sealed housing filled with an inert gas and a pressure responsive drive assembly for an indicating element such as a needle pointer. The housing is provided with a pressure relief valve to relieve excessive pressure within the housing that includes an inwardly facing integral frusto-conical projection with a central aperture in the back of the housing that receives a valve member which is actually a rivet covered by a flexible adhesive such as silicone rubber. The amount of adhesive and the housing wall area covered by adhesive determine, with the diameter of the head of the rivet, the pressure at which the rivet will be blown from the housing relieving internal pressure.

18 Claims, 5 Drawing Figures

INDICATING GAUGE WITH PRESSURE RELIEF VALVE

BACKGROUND OF THE PRESENT INVENTION

In the manufacture of vehicular instruments such as pressure and temperature gauges, it has been common practice to provide gauge housings or casings that are completely sealed so that the interior of the housing may be evacuated and filled with an inert gas such as argon. This evacuation, filling and sealing process frees the gauge mechanism from the entry of foreign material and also permits the instrument, when used as a pressure gauge, to more accurately indicate "absolute" pressure as opposed to "gauge" pressure.

The evacuation and filling process is usually performed after the gauge is completely assembled and sealed with the exception of a filling hole in the casing. This filling hole is generally used both in evacuating air from the instrument and also, immediately thereafter, in filling the housing with the inert gas. Thereafter the filling hole is sealed by a plug or fastener of some type.

Many vehicular instruments have pressure responsive elements in the operating mechanisms for driving the indicator. These include pressure responsive diaphragms and bourdon tubes. In diaphragm type movements a circular flexible diaphragm encloses one side of a pressure chamber which is exposed to varying pressures representing the variable parameter to be indicated. As pressure in the chamber increases, the diaphragm flexes outwardly moving an actuator element a distance proportional to the pressure within the chamber. A suitable mechanism is provided for converting the axial movement of this actuator to proportional pivotal movement of an indicator needle. In bourdon tube instruments, a curved tube, generally elliptical in cross-section, is connected directly to the indicator needle and in response to increasing pressures, the tube changes cross-section and elongates directly driving the pivotal indicating needle usually without any intermediate mechanism.

In both the diaphragm type and bourdon tube type instruments, there are instances when the components sealing the pressure chambers fail causing a rapid pressure increase within the housing of the instrument. Since these instruments are tightly sealed this creates the possibility of a very high pressure within the casing, possibly causing a rupture in the casing or more commonly in the lens closing the forward face of the casing, which is in the direction of the operator of the associated vehicle. Such instances, while infrequent, may cause serious injury to the operator of the vehicle, and less importantly, damage to other parts of the vehicle.

It is a primary object of the present invention to ameliorate the problems noted above and to provide an improved pressure relief valve and seal for a sealed casing instrument of the type that responds to variations in fluid pressure.

SUMMARY OF THE PRESENT INVENTION

In accordance with the present invention, a sealed vehicular instrument is provided of the type that responds to variations in fluid pressure representing a sensed parameter, that has a simple and improved pressure relief valve for exhausting the interior of the instrument when subjected to excessive internal fluid pressure.

The instrument may be either a pressure or temperature indicating instrument that has a sealed casing wherein the indicating element is driven by a pressure responsive assembly such as a diaphragm assembly or a bourdon tube element.

The present vehicular instrument includes a generally cupshaped housing or casing that in the exemplary embodiment shown has a diaphragm assembly mounted in a recess in the rear wall of the casing. The diaphragm assembly carries a central axially moving actuator that pivots a crankshaft rod driving a pivotally mounted indicator pointer. The forward end of the casing is covered by a lens sealed to the casing by a staked bezel and seal assembly.

During manufacture and after assembly is substantially completed, the interior of the casing is evacuated and filled through a suitable filling hole with an inert gas such as argon.

The pressure relief valve, according to the present invention, includes an aperture formed in the rear or backside of the casing by a frusto-conical stamped inwardly facing deformation. During assembly, a rivet having a shank portion with a diameter slightly less than the aperture is inserted into the aperture with its head engaging the outside of the frusto-conical projection, thereby closing the aperture. The head of the rivet and the outer surface of the frusto-conical portion are covered with a predetermined quantity of a resilient air cured adhesive, such as silicone rubber. One adhesive found suitable for this purpose is Dow-Corning No. 734-RTV adhesive, presently commercially available.

The rivet itself defines the valve member of the pressure relief valve, and the quantity of and surface area covered by the adhesive controls and determines, along with the diameter of the head of the rivet, the precise pressure within the casing at which the rivet will blow through the adhesive relieving excessive pressure within the housing.

In the exemplary embodiment shown, the aperture in the housing is between 0.098 and 0.103 inches, the outer diameter of the countersunk portion is 0.250 inches and the axial length of the countersunk projection is 0.06 inches. The head of the rivet is 0.125 inches and 0.02 cc of Dow-Corning No. 734-RTV adhesive covers the rivet and the outer surface of the countersunk portion to provide a blowout pressure for the relief valve of approximately 30 PSI. For a higher blowout pressure more than 0.02 cc of adhesive would be used.

Since the rivet is a very inexpensive item, and since only a small quantity of the resilient adhesive is required, the entire pressure relief valve assembly can be manufactured at a cost that does not affect the price copetitiveness of the instrument compared to instruments not having such pressure relief valves. Furthermore, the safety benefits gained from the pressure relief valve far exceed its nominal cost.

The aperture in the housing for the pressure relief valve may also be used as the filling hole, in which case the housing is evacuated and filled prior to insertion of the rivet and application of the adhesive.

DETAILED DESCRIPTION OF THE PREFERRED EMBODIMENT

Figure 1:
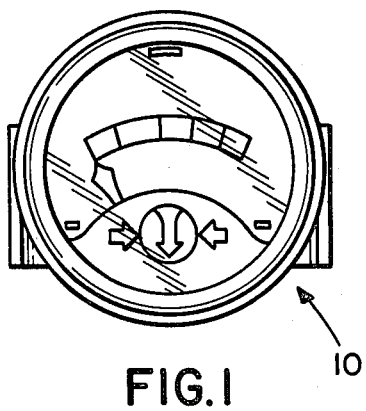
FIG. 1 is a front view of the present vehicular instrument.
Figure 2:
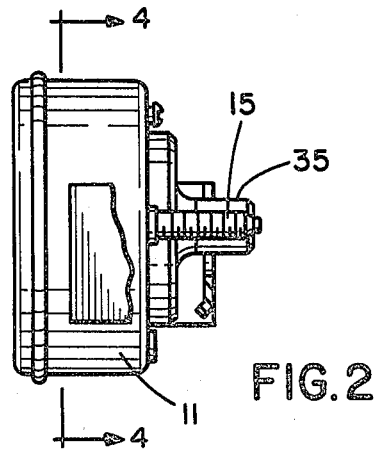
FIG. 2 is a side view of the present vehicular instrument with its rear bracket partly broken away.
Figure 3:
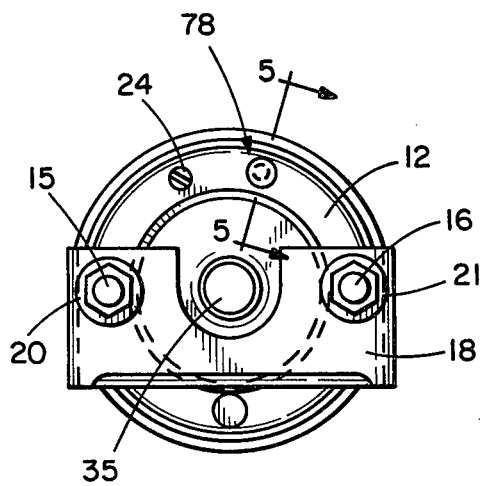
FIG. 3 is a rear view of the vehicular instrument illustrated in FIGS. 1 and 2.
Figure 5:
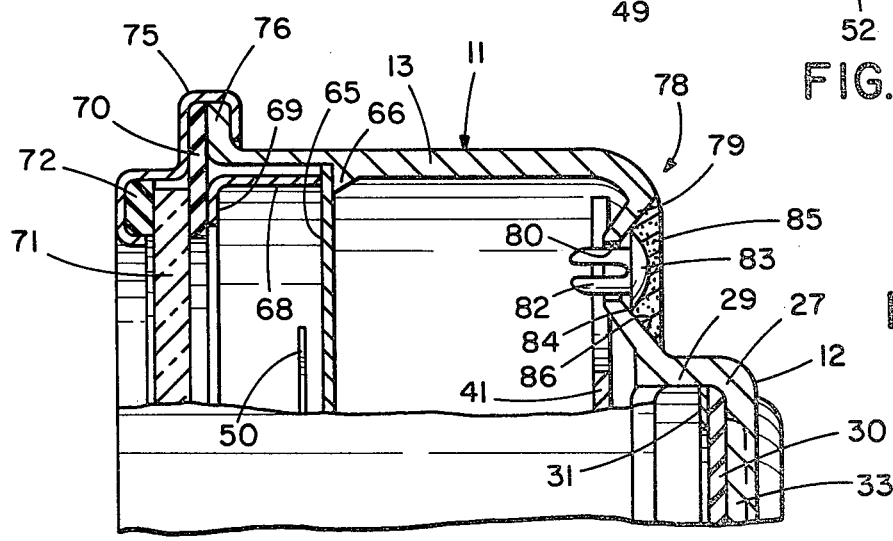
FIG. 5 is an enlarged fragmentary section of the instrument shown in FIGS. 1 to 4, taken generally along line 5—5 of FIG. 3 illustrating part of a diaphragm assembly and the pressure relief valve.

Referring to the drawings, wherein a pressure gauge 10 is illustrated of the type having a pressure responsive diaphragm assembly, the gauge is seen to include a generally cup-shaped housing member 11 having a rear wall 12 and annular side wall 13. The rear wall 13 has a pair of threaded fastening elements 15 and 16 projecting therefrom that receive and hold a U-shaped bracket 18 in position with cooperating threaded nut members 20 and 21. As seen in FIGS. 3 and 5, the rear wall 12 of the housing has an extruded inwardly directed aperture 23 therein closed by a self-tapping fastener element 24. Aperture 23 is the filling hole for the instrument, through which the interior of the casing 13, after assembly of the gauge, is evacuated, filled with an inert gas such as argon and then closed by the self-tapping screw 24.

A pressure responsive diaphragm assembly 27 is mounted in a cup-shaped recess 29 in housing rear wall 12. A flexible diaphragm 30 is mounted in recess 29 by a retaining ring 21 and defines a pressure chamber 33 that is subjected to air pressure from central rear fitting 35 which is adapted to be connected to a suitable pressure sender or transducer (not shown) of conventional construction. The sender subjects chamber 33 to pressure, usually air pressure, portional to variations in pressure within the mechanism to be monitored, such as engine oil pressure.

Figure 4:
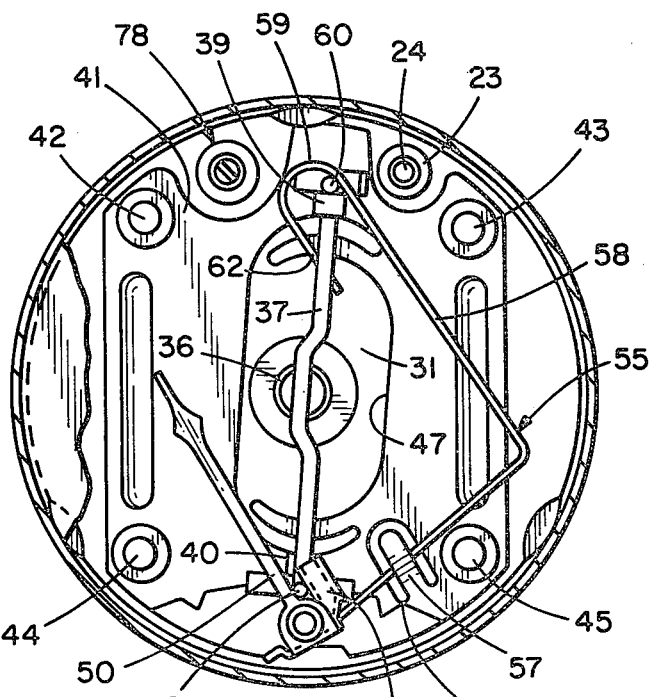
FIG. 4 is an enlarged section of the instrument shown in FIGS. 1 to 3 taken generally along line 4—4 of FIG. 2.

As seen in FIG. 4, diaphragm 30 is connected to move an actuator rod 36 axially. Rod 36 engages and rocks a crankshaft 37 mounted for rotation in bearings 39 and 40 in a mounting plate 41 fixed within the casing 11 by dowels 42, 43, 44 and 45. Diaphragm 30 is visible in FIG. 4 through an elongated aperture 47 in mounting plate 41.

Crank 37 has a forwardly extending projection 49 that fits between pivotal pointer 51 and spring retaining member 52 fixed to the pointer 50. As crankshaft 37 oscillates, projection 49 swings pointer 50 to positions representing the magnitude of the pressure within the pressure chamber 33. The needle 50 is biased to its lowest reading level, and backlash is eiliminated from crankshaft 37 by an L-shaped wire spring 55 retained in position by an integral finger 57 formed in mounting plate 41. Spring 55 has a first leg portion 58 having a hook portion 59 at one end thereof wrapped around projection 60 on crank 37 with its distal end 62 positioned under and engaging shaft 37. Spring 55 thus tends to urge the shaft 37 in a counterclockwise direction when viewed from the bottom of FIG. 4.

Spring 55 has another leg 63 that extends under integral finger 57 and has an end (not shown) that is hooked to the base of the pointer 50 to urge the pointer to its lowest reading position shown in FIG. 4.

As seen in FIG. 5, an indicator plate 65 is positioned against an integral shoulder 66 within casing 11 and is held in position by an annular retainer 68 that has a flange 69 engaged by a gasket 70. A lens 71 engages the outer surface of the gasket 70 and is sealed and held in position by an annular seal 72. The indicator plate 65, retaniner 68, gasket 70, lens 71 and seal 72 are held in position by a bezel 75 staked over an integral flange 76 at the forward end of the housing 11.

As seen clearly in FIG. 5, a pressure relief valve 78 is illustrated which actuates or "blows" upon a predetermined increase in pressure within the housing or casing 11. Such an increase could, for example, occur upon failure of the diaphragm 30. Pressure relief valve 78 permits the relief of this excessive pressure within the casing 11 from the rear side of the casing, minimizing the possibility of the lens 71 being blown in a forward direction from the instrument where it might injure person and property within the vehicle.

Relief valve 78 is seen to include an integral frustoconical inwardly directed projection or countersunk portion 79 that has a central aperture 80. Projection 79 is formed by stamping. In the exemplary embodiment illustrated, the outer diameter of the countersunk portion 79 is 0.250 inches and the inner diameter thereof, i.e. the diameter of aperture 80, is 0.098 to 0.103 inches and the axial depth of the projection 79 (minus the thickness of the casing) is 0.06 inches.

The aperture 80 is closed by a conventional oval head split nut rivet dimensioned 0.092 inches in diameter by ⅛th inch in length, that has a head diameter of 0.125 inches. Head 83 of the rivet has its outer edge 84 in sealing engagement with the outer surface of the projection 79 and the diameter of head 83 thus defines the effective pressure area against which the fluid within casing 11 acts.

The outer surface of the head 83 of rivet 82 and the exposed outer surface portions, i.e. side wall 86, of projection 79 are covered with a resilient adhesive 85, such as silicone rubber. One such adhesive that is found satisfactory for this purpose is Dow-Corning No. 734-RTV adhesive. The amount of adhesive 85 applied to rivet head 83 and wall 86 is selected to yield the desired "blow" or actuation pressure for the relief valve 78. For the dimensions of the projection 79 and the diameter of the rivet head 83 given above, the amount of adhesive 85 of the Corning-Dow type noted, is 0.02 cc and a "blow" pressure of 30 PSR.

The use of a rivet with a smaller head and/or the use of more adhesive 85 will increase the pressure at which the rivet 82 will break away from the housing 11 relieving excessive pressure therein. There is a substantially linear relationship (within the 20 to 60 PST range) between the quantity of adhesive 85 employed and the pressure at which the relief valve 78 will actuate or "blow".

The adhesive 85 also provides an excellent seal for the housing since the sloping wall 86 along with the normally higher atmospheric pressure (i.e. higher than inside casing 11) tend to drive the adhesive inwardly toward aperture 80.

The aperture 80 may also be used as the evacuation and filling hole, in which case the separate filling hole 23 would not be needed.

What is claimed:

1. An indicating instrument of the type that responds to pressure variations representing changes in a sensed parameter, comprising; housing means, a pressure responsive assembly in the housing means adapted to be connected to a pressure source that varies in accordance with the sensed parameter, an indicator in the housing means connected to be driven by the pressure responsive assembly so that the indicator provides a visual representation of variations in the sensed parameter, said housing means being sealed to prevent the entry of foreign material into the housing, and valve means for preventing an excessive increase in pressure in the housing means including an aperture in the housing means, a plug in the aperture constructed so that it may not pass inwardly into the housing means, and an adhesive covering and sealing the plug, said adhesive controlling the internal pressure in the housing means at which the plug will be released from the housing means aperture thereby relieving pressure within the housing means.

2. An indicating instrument of the type that responds to pressure variations representing changes in a sensed parameter, as defined in claim 1, wherein the aperture is formed by an integral inward deformation in the housing means.

3. An indicating instrument of the type that responds to pressure variations representing changes in a sensed parameter, as defined in claim 2, wherein the inward deformation forming the aperture is frusto-conical in configuration.

4. An indicating instrument of the type that responds to pressure variations representing changes in a sensed parameter, as defined in claim 3, wherein the adhesive is a resilient material that adheres to the frusto-conical walls of the inward deformation.

5. An indicating instrument of the type that responds to pressure variations representing changes in a sensed parameter, as defined in claim 2, wherein the plug has a generally cylindrical shank portion extending through said aperture and a head portion having a diameter greater than the aperture and engaging the inward deformation.

6. An indicating instrument of the type that responds to pressure variations representing changes in a sensed parameter, as defined in claim 1, wherein the adhesive is silicone rubber.

7. An indicating instrument of the type that responds to pressure variations representing changes in a sensed parameter, as defined in claim 5, wherein the plug is a rivet.

8. A seal and valve for an indicating instrument of the type that responds to pressure variations representing changes in a parameter desired to be monitored, said instrument including housing means, a pressure responsive assembly in the housing means adapted to be connected to a pressure source that varies in accordance with the the sensed parameter, an indicator in the housing means connected to be driven by the pressure responsive assembly so that the indicator provides a visual representation of variations in the sensed parameter, said housing means being sealed to prevent the entry of foreign material into the housing, said seal and valve preventing an increase in pressure within the housing means above a predetermined value and comprising; an aperture in the housing means, a plug in the aperture constructed so that it may not pass inwardly into the housing means, and an adhesive covering and sealing the plug, said adhesive controlling the internal pressure in the housing means at which the plug will be released from the housing means aperture thereby relieving pressure within the housing means.

9. A seal and valve for an indicating instrument of the type that responds to pressure variations representing changes in a parameter desired to be monitored, as defined in claim 8, wherein the aperture is formed by a countersunk deformation in the housing means, said plug having a shank portion extending into said aperture and a head engaging the countersunk deformation, said adhesive being adhered to the countersunk deformation.

10. A seal and valve for an indicating instrument of the type that responds to pressure variations representing changes in a parameter desired to be monitored, as defined in claim 8, wherein the adhesive is silicone rubber, said plug being a rivet.

11. A seal and valve for an indicating instrument of the type that responds to pressure variations representing changes in a parameter desired to be monitored, said instrument including housing means, a pressure responsive assembly in the housing means adapted to be connected to a pressure source that varies in accordance with the sensed parameter, an indicator in the housing means connected to be driven by the pressure responsive assembly so that the indicator provides a visual representation of variations in the sensed parameter, said housing means being sealed to prevent the entry of foreign material into the housing, said seal and valve preventing an increase in pressure within the housing means above a predetermined value and comprising; an inwardly extending generally frusto-conical projection in the housing means defining an aperture, a plug for the aperture having a shank portion and a head portion having a larger diameter than the aperture and engaging the outer surface of the frusto-conical projection, and an adhesive covering the head of the plug and at least a portion of the outer surface of the frusto-conical projection, the amount of adhesive being selected to control the housing means internal pressure at which the plug will blow from the housing means to relieve excessive internal pressure in the housing means.

12. A seal and valve for an indicating instrument of the type that responds to pressure variations representing changes in a parameter desired to be monitored, as defined in claim 11, wherein the plug is a rivet and the adhesive is silicone rubber.

13. A seal and valve for an indicating instrument of the type that responds to pressure variations representing changes in a parameter desired to be monitored, as defined in claim 11, wherein the area of the head of the plug is exposed to fluid pressure within the housing means.

14. An indicator assembly, comprising; a generally cup-shaped housing, a lens enclosing the cup-shaped housing, a pressure responsive indicator in the housing, an inwardly extending aperture in the housing, a pressure relief valve member spaced from the lens extending into the aperture having a head preventing it from entering the housing, and a cover member engaging the outside of the valve member and engaging and gripping the housing to control the pressure at which the cover member breaks away from the housing to release the valve member and fluid pressure in the housing.

15. An indicator assembly, comprising; a generally cup-shaped housing, a pressure responsive indicator in the housing, an inwardly extending aperture in the housing, a valve member extending into the aperture having a head preventing it from entering the housing, and a seal member covering the valve member and at least part of the recess to control the pressure at which the valve member opens to release fluid pressure in the housing, the recess being formed by a frusto-conical projection on the housing, said valve member being a rivet, and said seal member being an adhesive.

16. A seal and valve for an indicating instrument of the type that responds to pressure variations representing changes in a parameter desired to be monitored, said instrument including housing means, a lens enclosing the housing means, a pressure responsive assembly in the housing means adapted to be connected to a pressure source that varies in accordance with the sensed parameter, an indicator in the housing means connected to be driven by the pressure responsive assembly so that the indicator provides a visual representation of variations in the sensed parameter, said housing means being sealed to prevent the entry of foreign material into the housing, said seal and valve preventing an increase in pressure within the housing means above a predetermined value and comprising; an inwardly extending aperture in the housing means spaced from the lens, a valve member extending into the aperture having a head preventing it from entering the housing, and a cover member engaging the outside of the valve member and engaging and gripping the housing to control the pressure at which the cover member releases from the housing to free the valve member and relieve fluid pressure in the housing.

17. A seal and valve for an indicating instrument of the type that responds to pressure variations representing changes in a parameter desired to be monitored, said instrument including housing means, a pressure responsive assembly in the housing means adapted to be connected to a pressure source that varies in accordance with the sensed parameter, an indicator in the housing means connected to be driven by the pressure responsive assembly so that the indicator provides a visual representation of variations in the sensed parameter, said housing means being sealed to prevent the entry of foreign material into the housing, said seal and valve preventing an increase in pressure within the housing means above a predetermined value and comprising; an inwardly extending aperture in the housing, a valve member extending into the aperture having a head preventing it from entering the housing, and a seal member covering the valve member and at least part of the recess to control the pressure at which the valve member opens to relieve fluid pressure in the housing, the recess being formed by a frusto-conical projection on the housing, said valve member being a rivet, and said seal member being an adhesive.

18. An indicating instrument of the type that responds to pressure variations representing changes in a sensed parameter, comprising; housing means, a pressure responsive assembly in the housing means adapted to be connected to a pressure source that varies in accordance with the sensed parameter, an indicator in the housing means connected to be driven by the pressure responsive assembly so that the indicator provides a visual representation of variations in the sensed parameter, said housing means being sealed to prevent the entry of foreign material into the housing, and valve means for preventing an excessive increase in pressure in the housing means including an aperture in the housing means, a closure member in the aperture constructed so that it may not pass inwardly into the housing means, and an adhesive over the closure member, said adhesive controlling the internal pressure in the housing means at which the closure member will be released from the housing means aperture thereby relieving pressure within the housing means.

* * * * *

UNITED STATES PATENT AND TRADEMARK OFFICE
CERTIFICATE OF CORRECTION

PATENT NO. : 4,373,398

DATED : February 15, 1983

INVENTOR(S) : George M. Ponczek

It is certified that error appears in the above-identified patent and that said Letters Patent is hereby corrected as shown below:

Col. 1, line 54, after "importantly" cancel ----,----.

Col. 2, line 10, cancel "moving" and substitute ----movable---- therefor.

Col. 2, line 19, after "valve" cancel ----,----.

Col. 2, line 20, after "invention" cancel ----,----.

Col. 2, line 29, cancel "cured" and substitute ----curable---- therefor.

Col. 4, line 43, cancel "PSR" and substitute ----PSI----therefor.

Col. 4, line 48, cancel "PSR" and substitute ----PSI----therefor.

IN THE CLAIMS:

Col. 5, line 3, cancel "and".

Col. 6, line 64, cancel "recess" and substitute ----aperture---- therefor.

Col. 6, line 66, cancel "recess" and substitute ----aperture---- therefor.

UNITED STATES PATENT AND TRADEMARK OFFICE
CERTIFICATE OF CORRECTION

PATENT NO. : 4,373,398

DATED : February 15, 1983

INVENTOR(S) : George M. Ponczek

It is certified that error appears in the above-identified patent and that said Letters Patent is hereby corrected as shown below:

Col. 8, line 8, cancel "recess" and substitute ----aperture---- therefor.

Col. 8, line 10, cancel "recess" and substitute ----aperture---- therefor.

Signed and Sealed this

Sixth Day of September 1983

[SEAL]

Attest:

Attesting Officer

GERALD J. MOSSINGHOFF

Commissioner of Patents and Trademarks